INVENTOR
RENÉ JEAN RATIÉ
BY
ATTORNEY.

Patented Mar. 11, 1947

2,417,176

UNITED STATES PATENT OFFICE 2,417,176

VARIABLE PITCH PROPELLER CONTROL AND INDICATOR

René Jean Ratié, Montrouge, France; vested in the Attorney General of the United States Application April 11, 1941, Serial No. 388,128
In France April 24, 1940

5 Claims. (Cl. 170—163)

The present invention concerns the control of the pitch variations in propellers in which the pitch is variable in flight, and of the type in which the blades, pivoting relatively to the hub are coupled by a mechanism controlled by an electric motor having a circuit which, previously closed by the pilot, or by a regulator linked with the working speed of the engine driving the propeller, for effecting a variation of the pitch in one direction or in the other, is automatically cut off when the pitch has reached a predetermined value.

This electric motor can have two directions of operation or it can have a single direction if a kinematic reverser is connected thereto. The first case is the most frequently adopted and it is the one which will be contemplated in the following. However, it is to be understood that the invention applies to both cases.

The invention is adapted to combine, in one and the same apparatus of reduced dimensions, the elements indicated hereinafter, which, in known installations are either distinct or omitted in some cases, as follows:

Automatic control of the change of pitch in one direction or in the other;

Hand control of the change of pitch in one direction or in the other;

Independent adjustment of the amplitudes of the change of pitch in both directions;

The pitch indicator.

For this purpose, the apparatus forming the subject-matter of the invention is mainly characterised by the combination of three cams, viz:

A cam for automatically breaking the circuit of the motor at the end of the occurrence of change of pitch in one direction;

A cam for controlling the automatic breaking of the circuit of the motor at the end of the occurence of change of pitch in the other direction;

A cam having a double boss, capable of being controlled by hand, and comprising two bosses, one of which controls the circuit of the motor for one direction, the other, for the reverse direction; all three cams being constantly connected to the change pitch mechanism by planet pinions having a common gyration, the planet pinions of each cam meshing with a distinct sun wheel which allows: for the two first cams, the adjustment of the point of stoppage of the motor, for the third cam, the angular displacement of the latter from a member controlled by hand.

In a form of construction of the apparatus above defined in its principle, the three cams are arranged on one and the same shaft coinciding with the theoretical axis of the index of the pitch indicator, and the sun wheel controlling the hand cam is connected to the case of the apparatus which constitutes the operating member.

A unit is thus obtained, contained in a cylindrical case with a front face which carries a glass plate through which can be seen the index of the pitch indicator, and the dimensions of which are extremely reduced.

The accompanying drawings illustrate, by way of example only, such a form of construction of the apparatus forming the subject-matter of the invention.

Figure 1:
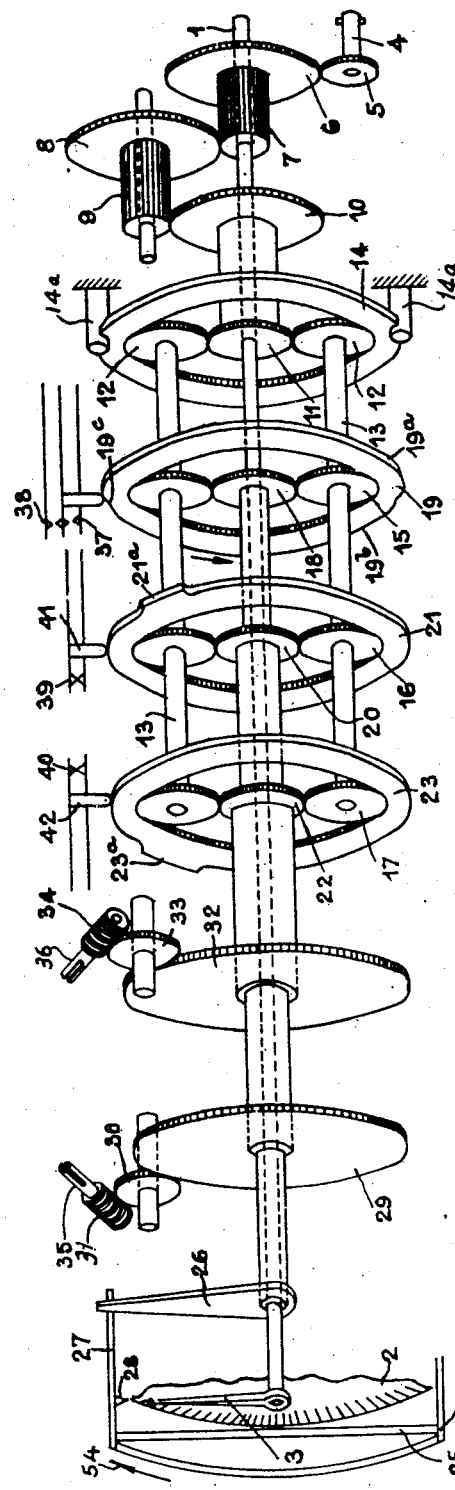
Fig. 1 is a diagram, with illustration in perspective view, of the mechanical arrangement of the apparatus.
Figure 4:
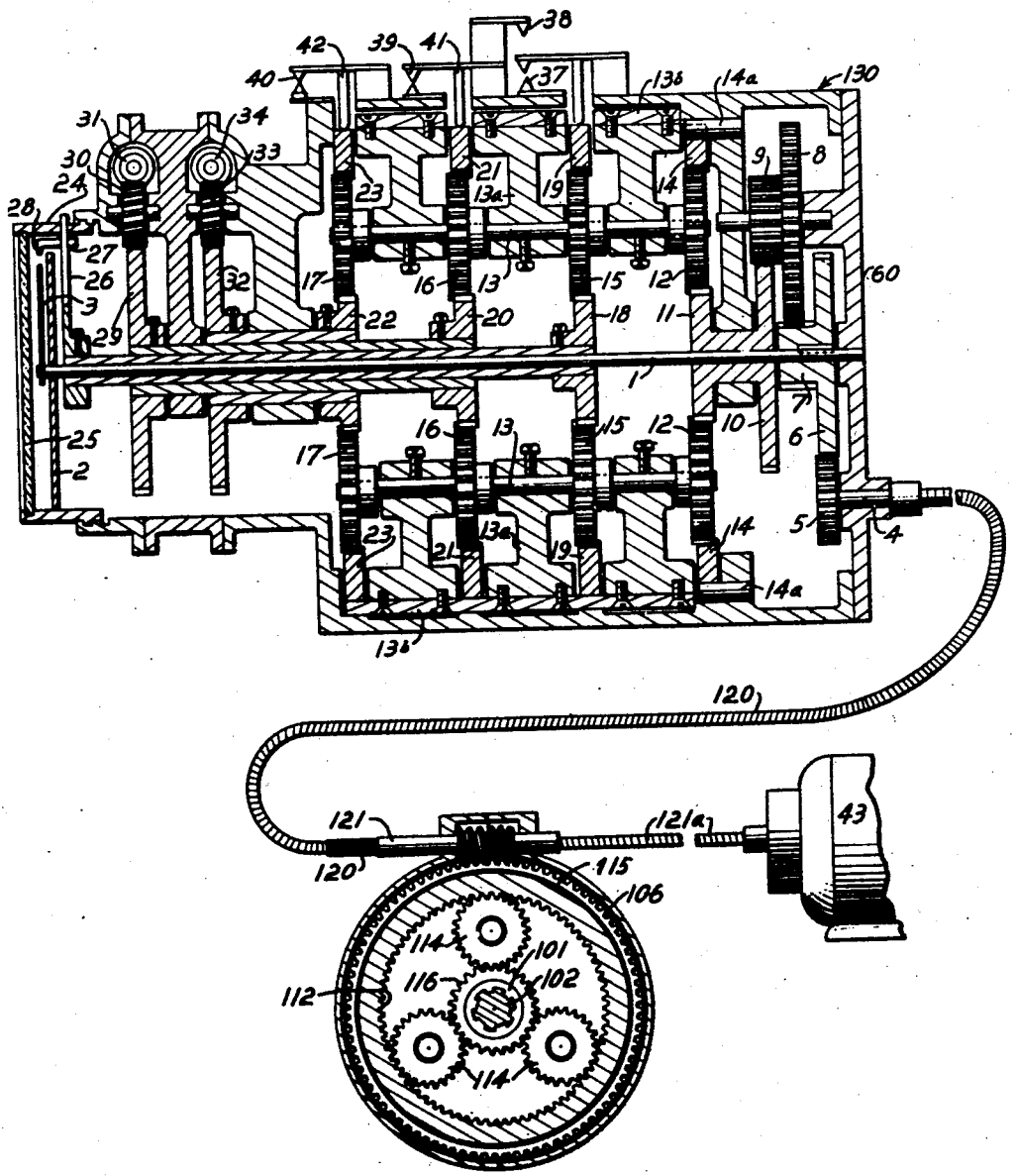
Figure 4 is a sectional view taken through the propeller hub along the line 4—4 in Figure 3, and also showing the pitch control apparatus of Figure 1 connected to this hub.

For facilitating the illustration and description of the apparatus, the various parts have been arranged in Figure 1 by spacing them apart in the axial direction whereas in Figure 4 the parts are shown in their proper positions. It can be immediately seen that it is possible to bring them close together to group them into a case of reduced height. Neither the rear plate, nor the lateral wall of said case has been illustrated in Figure 1.

A shaft 1 is arranged according to the theorétical axis of the entire apparatus and journalled at its ends, on the one hand, in the rear plate 60 (Fig. 4) and, on the other hand, in a front plate 2 which, in this embodiment, constitutes the dial of the pitch indicating device. An index 3 rigidly secured on the shaft 1 moves over the dial 2 and it is intended to indicate, in direction and angular value, the changes of pitch. For that purpose, the shaft 1 is connected, by a flexible connection 4, 120 and 121 to the change pitch mechanism. This connection is such that shaft 1 is always in a specific angular position depending upon the pitch to which the propeller blades are adjusted.

Figure 3:
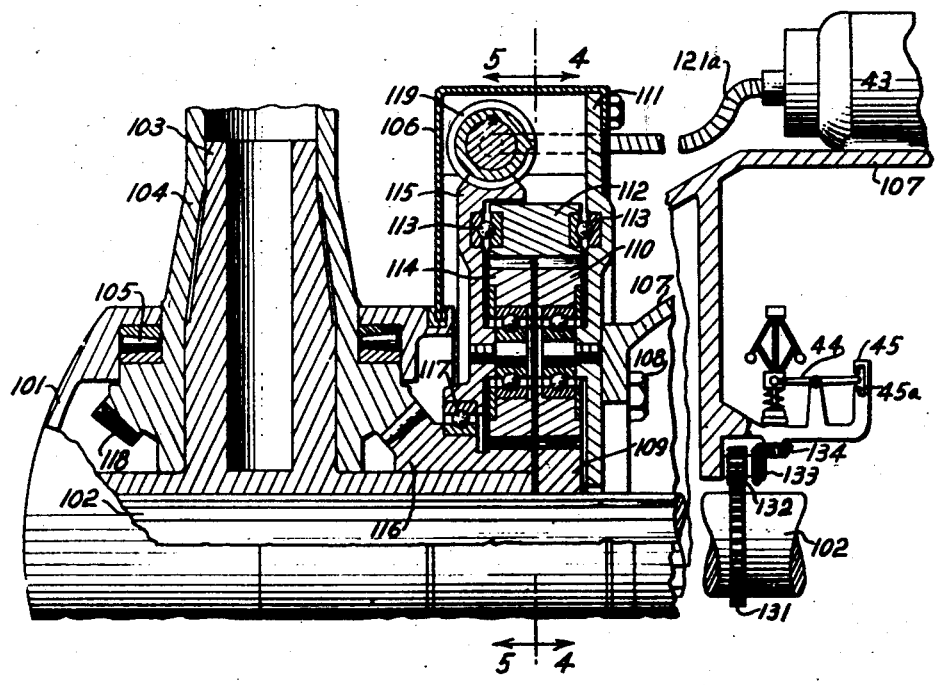
Figure 3 is a sectional view through an aeroplane propeller hub and adjacent engine casing, showing portions of my invention associated therewith.
Figure 5:
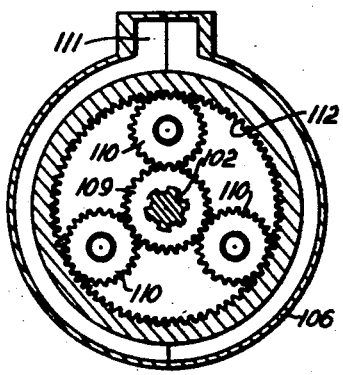
Figure 5 is a sectional view taken along the line 5—5 in Figure 3.

In Figures 3, 4 and 5 there is shown in detail one example of a propeller hub and pitch change mechanism with which the present invention is adapted to be associated. In this example, the pitch change motor is mounted on the fuselage or engine casing, but it is evident that the present invention is not restricted to such an arrangement. The variable pitch propeller mechanism shown in connection with the present invention is similar to that disclosed in the patent to MacCallum, No. 2,020,366 of November 12, 1935.

Referring to Figures 3, 4 and 5, the numeral 101 denotes a propeller hub which is mounted on the end of driving shaft 102, said hub having spindles 103 for supporting propeller blades 104. Blades 104 rotate on bearings 105 disposed between proximate flanges on hub 101 and blades 104 respectively.

The gear mechanism for varying the pitch of the propellers is mounted in an oil case 106, which in turn, is secured to the fuselage or engine casing 107 by bolts 108. This gear system comprises a gear 109 fixedly secured to shaft 102, which gear drives idler gears 110 rotatably mounted on stationary plate 111 forming the rear wall of the oil case 106. These idler gears 110 drive a double internal ring gear 112, rotatably mounted between bearings 113, said gear 112 driving a second set of idler gears 114 which are rotatably mounted upon worm gear wheel 115. Gears 114 are of the same diameter as the above-mentioned idler gears 110. By referring to Figure 3, it is seen that gears 114 drive propeller blade 104 through a double gear 116, and a beveled gear 118. A worm 119 meshes with worm gear 115, said worm being drivably connected to a motor 43 on engine casing 107 by means of a flexible connection 121ª.

During operation, the gear 109 drives gear 116 in the same direction and at the same speed as shaft 102, through the gears 110, 112 and 114 when worm gear 115 is held stationary. When it is desired to decrease or increase the propeller pitch the worm gear 115 is rotated in a corresponding direction by members 43, 121ª and 119 to thereby increase or decrease the speed of gear 116 and produce rotation of gears 118 and associated blades 104.

The above-described pitch change mechanism is connected to the controlling apparatus shown in Figures 1 and 4 by means of a flexible connection 4, 120 and 121. The flexible connection 4, 120 and 121 is, in this embodiment, connected by a pinion 5 to the gear 6 fast on shaft 1.

A train comprising: the pinion 7 fast on shaft 1, including counter-motion: gear 8—pinion 9, and gear 10 rigid with the pinion 11 and loosely mounted on shaft 1, connects the latter to two planet pinions 12 freely journalled on a frame or cage illustrated by rods 13, brackets 13ª and casing 13ᵇ.

Said planet pinions 12 in engagement with the central sun wheel 11 mesh with the inner set of teeth of a fixed internal gear 14, so that the rotation of pinion 11 produces the gyration of the planet pinions 12. This gyration is transmitted, by the members 13, 13ª and 13ᵇ to groups of planet pinions 15—16—17. Gear 14 is fixed to outer casing 130 by means of pins 14ª.

The group 15 meshes with a central sun wheel 18 and with the inner set of teeth of an internal gear or cam 19.

The group 16 meshes with a central sun wheel 20 and with the inner set of teeth of a cam 21.

The group 17 meshes with a central sun wheel 22 and with the inner set of teeth of a cam 23.

The three sun wheels 18, 20, 22 are loosely mounted on shaft 1. The sun wheel 18 is angularly connected to a hand control member which, in this embodiment, is the rotatable front part 24 of the case of the apparatus, said part comprising a glass plate 25 through which can be seen the dial 2 and the index 3 of the indicator. The front part 24 is illustrated in Fig. 4 in section and the actual structure is in the form of a cylindrical rim 24 carrying the glass plate 25 and rotatably mounted in the adjacent end of the case 130 of the apparatus. Within the case 130, the front part 24 is connected to sun wheel 18. The connection between 18 and 24 is illustrated by an arm 26 and a rod 27 which carries an index 28 arranged in front of the dial 2.

The sun wheels 20 and 22 are respectively connected, by pinions 29, 30 and worm 31; and also by pinions 32, 33 and worm 34, to adjusting rods 35 and 36 which are adjusted, for instance by means of a screw-driver and which are locked in the position of adjustment chosen by said worms.

The cam 19 (so-called hand cam) comprises two bosses 19ª and 19ᵇ connected by inclines 19ᶜ of neutral position. One of these bosses acts to close a contact at 37, the other to close a contact at 38.

The cams 21 and 23 each comprise only one narrow boss 21ª and 23ª which act to cut off a contact at 39 and at 40. When said bosses are spaced from push-pieces 41 and 42, the contacts 39 and 40 remain closed.

Figure 2:
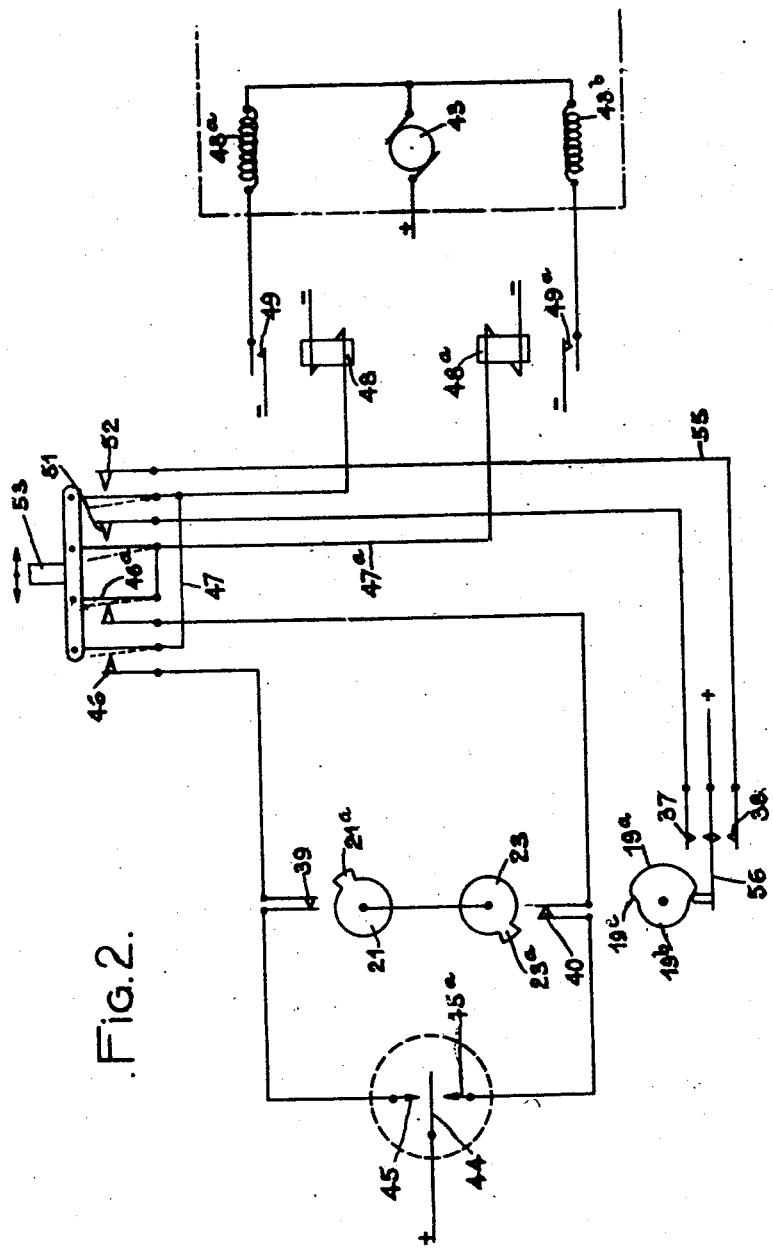
Fig. 2 is an electrical diagram of the operation of the entire control of the pitch variations.

In the electric diagram of Fig. 2, the cams 19—21—23 and the contacts 37—38, 39—40 have been shown as having the same reference numbers as in Fig. 1. It will be noted by observing Fig. 3 that a speed responsive regulator designated by reference characters 44, 45 and 45ª is provided, said regulator being driven by the shaft 102 through a gear train 131, 132, 133 and 134.

The operation of the apparatus is as follows:

Case of automatic control

This case is that in which the speed responsive regulator linked with the working speed of the engine intervenes for producing the pitch variations which must allow the engine to resume its optimum working speed when it departs therefrom. If the working speed lowers, the pitch is diminished; if the working speed increases, the pitch is increased. The speed responsive regulator is of any known type.

For putting the electric motor 43 for the change of pitch under the control of the regulator, the pilot acts as a key 53 to close the contacts at 46 and 46ª as shown in dotted lines. If the propeller rotates too rapidly, that is to say if the engine races, the regulator closes the contact at 44—45. A circuit is established through the positive pole of the battery or source of current, contacts 44—45, contact 39, contact 46, winding of relay 48 and negative pole of the source. The relay 48 is energized and closes the contact at 49 which establishes the circuit exciting the motor 43 in the direction for increasing the pitch. This circuit is as follows: from the negative pole of the source of current, through contact 49, inductor 43ª, armature 43 and to the positive pole of the source of current. The motor 43 rotates in the direction for increasing the pitch of the propeller and drives, by the flexible connection above mentioned, the shaft 4 (Fig. 1) which acts:

1. Through the medium of pinion 5 and gear 6, to drive shaft 1 which carries the index 3 and indicates to the pilot the direction and the amplitude of the change of pitch.

2. To drive, through the train 5—6—7—8—10—11 the frame 13, 13ª and 13ᵇ which carries the various planet pinions. The wheels 22 and 20 being stationary, both wheels 21 and 23 are rotatably driven and limit the evolution of the pitch of the propeller between two extreme values. Through the medium of the cam-boss 21ª, the wheel 21 cuts off the contact 39 of the circuit exciting relay 48, this breaking determining the maximum value of the pitch, which value is adjusted by acting on the rod 36, as explained above.

When the regulator acts for reducing the pitch, the contact is closed at 44—45ª and relay 48ª is energized through 40—48ª—47ª. The contact is closed at 49ª and the inductor 43ᵇ is energized. The motor 43 rotates in the direction for reducing the pitch. It is stopped, either by the regulator which cuts off the contact at 44—45ª, or by the cam-boss 23ª which breaks the contact at 40 and determines the minimum value of the pitch.

*Case of hand control*

If the pilot desires to give to the pitch the entire value he has chosen, he actuates the key 53 so as to close the contacts 51 and 52, the contacts at 46—46ª being cut off. This operation has as its effect to put the motor 43 under the control of the contacts 37 and 38.

The pilot then moves the front part of the case 24 to bring the index 28 opposite the point of the graduation of the dial 2 corresponding to the pitch desired. The angular displacement thus effected through the medium of the front part of the case 24 is transmitted to the wheel 19 through the medium of the members 27—26 and the planet pinions 15. If the pilot has indicated on the dial 2, as just explained, a pitch greater than the initial pitch, the contact 38 is closed, which has the effect, as can be seen on the diagram of Fig. 2, of energizing relay 48 and starting the motor 43 in the direction for increasing the pitch. As already explained concerning the automatic change of pitch, the flexible connection at 4, 120 and 121 causes wheel 19 to rotate through the medium of the train: 5—6—7—8—9—10—11—12—15. As soon as wheel 19 has resumed its initial position, which occurs when the index 3 has come opposite the index 28, the contact 38 is cut off and the change pitch movement is stopped.

The operation is identical when the pilot desires to pass from a given pitch to a smaller pitch. In this case, the contact 37 is closed and relay 48ª is energized as well as the inductor 43ᵇ.

Any automatic preselecting system intended to determine the optimum pitch can be combined with the hand control which has just been described.

It will be noted that the planet pinions 12—15—16—17 being loosely mounted or freely journalled on the frame 13, the following operations: rotation of knob 35, rotation of knob 36, rotation of dial 24 for the hand control of cam 19, are absolutely independent from and do not affect the gyration of the frame 13, 13ª and 13ᵇ. Said gyration occurs only if the pinion 11 rotates, that is to say, if the motor 43 rotates by modifying the setting of the blades.

During the time the device is under hand control, cams 21 and 23 exert no control effect because the circuits of switches 39 and 40 are open at switches 46 and 46ª. Conversely when the apparatus is under automatic control, cam 19 exerts no control effect because the circuits of switches 37 and 38 are open at switches 51 and 52.

The apparatus according to the invention, lends itself by its very conception, to the association of the change pitch controls of all the propellers of one and the same multi-engine aeroplane. It suffices to juxtapose on one and the same board several apparatuses such as that described, by mechanically connecting, by means of suitable connections, the automatic and hand control members from one apparatus to the other. For the hand control of the change of pitch, in particular, it suffices for the pilot to act on a single movable dial such as 24 for giving the same pitch to all the propellers.

What I claim as my invention and desire to secure by Letters Patent is:

1. Apparatus for controlling and indicating pitch variations of the blades of a propeller, including a pitch changing motor having two control circuits for operating the same in opposite directions, independent switch means in each of said circuits, a movable cam having means associated therewith and actuated thereby for opening the circuit of said motor to stop the same at the end of a pitch changing operation in one direction, a second movable cam also having means associated therewith for opening the circuit of said motor at the end of a pitch changing operation in the opposite direction, a third movable cam having two projections and associated means actuated thereby for selecting and operating either one of said control circuits so as to operate the motor accordingly for changing the pitch in either direction, a plurality of planet pinions arranged to have a common gyration, sun gears connected to and moving said cams, and means operatively communicating the pitch changing movement of the propeller blades to said sun gears.

2. Apparatus for controlling and indicating pitch variations of the blades of a propeller, including a pitch changing motor having two control circuits for operating the same in opposite directions, independent switch means in each of said circuits, a movable cam provided with internal gear teeth and having means associated therewith and actuated thereby for opening the circuit of said motor to stop the same at the end of a pitch changing operation in one direction, a second movable cam also provided with internal gear teeth and having means associated therewith for opening the circuit of said motor at the end of a pitch changing operation in the opposite direction, a third movable cam provided with internal gear teeth and having two projections and associated means actuated thereby for selecting and operating either one of said control circuits so as to operate the motor accordingly for changing the pitch in either direction, a shaft for a pitch indicator disposed centrally with respect to the three sets of internal gear teeth, three pinions journalled on said shaft and each corresponding to a cam of the three, planet pinions disposed between and meshing with said pinions and said sets of internal gear teeth, a common mounting means for said planet pinions to cause them to have a common gyration, and means for operatively connecting said mounting means to the motor.

3. Apparatus for controlling and indicating pitch variations of the blades of a propeller, including a pitch changing motor having two control circuits for operating the same in opposite directions, independent switch means in each of said circuits, a movable cam provided with internal gear teeth and having means associated therewith and actuated thereby for opening the circuit of said motor to stop the same at the end of a pitch changing operation in one direction, a second movable cam also provided with internal gear teeth and having means associated therewith for opening the circuit of said motor at the end of a pitch changing operation in the opposite direction, a third movable cam provided with internal gear teeth and having two projections and associated means actuated thereby for selecting and operating either one of said control circuits so as to operate the motor accordingly for changing the pitch in either direction, a shaft for a pitch indicator disposed centrally with respect to the three sets of internal gear teeth, three pinions journalled on said shaft and each corresponding to a cam of the three, two adjusting means for the first two cams, means for connecting said adjusting means individually to the two pinions on said shaft which correspond to said two first cams, planet pinions disposed between and meshing with all of said pinions and said sets of internal gear teeth, a common mounting means for said planet pinions to cause them to have a common gyration, and means for operatively connecting said mounting means to the motor.

4. Apparatus according to claim 2, having a casing for enclosing the members of the apparatus having a rotatable wall forming a manually operable control means for the pinions corresponding to the third cam, and means for transmitting movement of said wall to said pinion.

5. Apparatus according to claim 3, having a casing for enclosing the members of the apparatus having a rotatable wall forming a manually operable control means for the pinions corresponding to the third cam, and means for transmitting movement of said wall to said pinion.

RENÉ JEAN RATIÉ.

REFERENCES CITED

The following references are of record in the file of this patent:

UNITED STATES PATENTS

| Number | Name | Date |
| --- | --- | --- |
| 1,907,014 | Sperry | May 2, 1933 |
| 1,958,261 | Blanchard | May 8, 1934 |
| 1,968,029 | Couch | July 31, 1934 |
| 2,020,366 | MacCallum | Nov. 12, 1935 |
| 2,127,687 | Heath | Aug. 23, 1938 |
| 2,155,586 | Ebert | Apr. 25, 1939 |
| 2,187,364 | Ratié | Jan. 16, 1940 |
| 2,228,776 | Mullen | Jan. 14, 1941 |
| 2,232,753 | Wilson | Feb. 25, 1941 |

FOREIGN PATENTS

| Number | Country | Date |
| --- | --- | --- |
| 352,906 | Italian | Sept. 25, 1937 |
| 451,520 | British | Aug. 7, 1936 |